TRAFFIC DISTRIBUTION BY THE BUSINESS RATE OF LINE GROUPS

Filed July 26, 1966

2 Sheets-Sheet 1

3,459,898

TRAFFIC DISTRIBUTION BY THE BUSINESS RATE OF LINE GROUPS

Jacques Henri Dejean, Ris-Orangis, and Charles Henri Emile Grandjean, Villejuif, France, assignors to International Standard Electric Corporation Filed July 26, 1966, Ser. No. 567,995
Claims priority application France, July 27, 1965, 26,091
Int. Cl. H04m 3/00
U.S. Cl. 179—18 1 Claim

ABSTRACT OF THE DISCLOSURE

Testing circuits indicate the amount of traffic in each line group. The call is routed to the group which has the lowest traffic rate.

The present invention concerns circuits provided for balancing the traffic distribution between the different sections of the terminal stage in a telephone exchange.

In order to decrease the number of cross points per subscriber in the telephone exchanges, especially in the electronic or semi-electronic exchanges, each section of the terminal stage of an exchange is assigned only to a restrictive number $n$ of subscribers, this number $n$ ranging usually between ten and twenty. But it is known that the relative fluctuation of the traffic offered to a terminal section having $n$ subscribers, i.e. the ratio of the standard deviation over the traffic average offered to the said section, is proportional to $$\frac{1}{\sqrt{n}}$$

Since this relative fluctuation is the more important as $n$ is smaller, this being the case for the numbers quoted hereabove, it is necessary to carry out a balancing in order not to disadvantage a too much important number of groups of subscribers for which the blocking of the terminal section to which they are connected would reach prohibitive values.

This balancing may be carried out in several ways. The first one consists in listing first the subscribers of the exchange according to their traffic, then to distribute them in a way as homogeneous as possible between the different sections of the terminal stage, by assigning to each section the same number of high traffic subscribers and the same number of low or average traffic subscribers. The second one consists in modifying the assignment of the lines to the different terminal sections, taking into account results provided by traffic measurements, the assignment change being obtained by acting over the general dispatcher. This modification may be carried out periodically, if necessary.

These two methods present the major inconvenience of not being adapted in a continuous way to the traffic fluctuations.

The object of the present invention is thus to make use of circuits enabling a permanent balancing of the traffic between the sections of the terminal stage. To this effect, the lines of a subscriber with grouped lines are connected to different terminal sections and the connection is set up with that of the idle lines which is connected to the terminal section the traffic of which is the smaller at the moment of the call.

The present invention will be particularly described with reference to the accompanying drawings in which:

FIGURE 1 represents the simplified operational diagram of a telephone exchange making use of the circuit according to the present invention. Assumption will be made that the different operations which have to be carried out for connecting a calling subscriber to a called subscriber are achieved through electronic or semi-electronic means.

Figure 1:
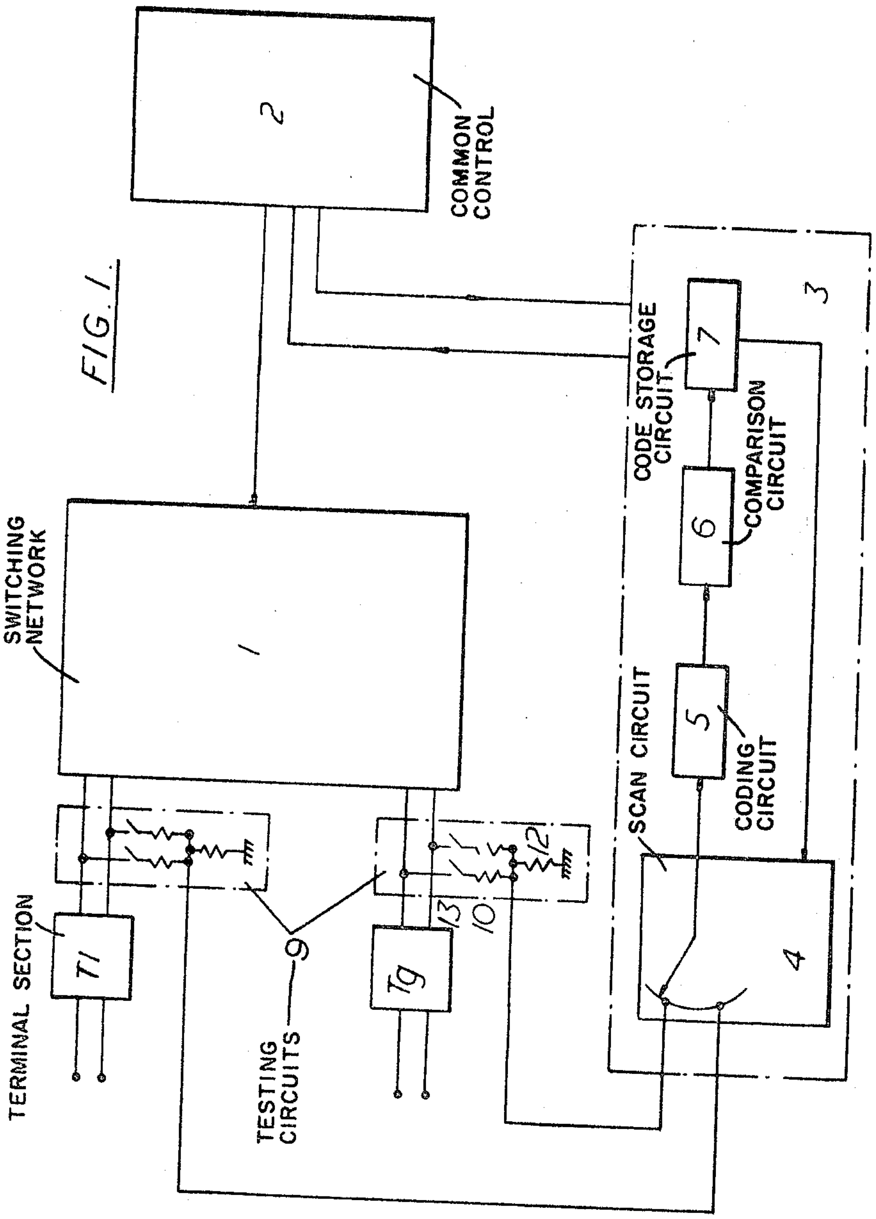
FIGURE 1 represents an operational diagram of an electronic or semi-electronic telephone exchange making use of the circuit according to the invention.

On this figure, the switching network 1 controlled by the control circuit 2 enables to connect a calling subscriber, connected directly to the telephone exchange or indirectly through another exchange linked to the exchange considered, to any subscriber of the said exchange, provided however that the line of the called subscriber is idle and accessible, i.e. that the called subscriber should not be already in communication with another subscriber, and that the different possible paths for connecting them should not be all of them used already for other connections.

This telephone exchange comprises a certain number N of lines, N being for instance close to ten thousands, which are distributed into $g$ terminal sections T1 to T$g$, each group serving for instance a same number $n$ of lines; if a number $n$ close to twenty is chosen, the telephone exchange will be $g$=500 terminal sections. But the relative fluctuation of the traffic in these sections is proportional to $$\frac{1}{\sqrt{n}}$$

and is thus the more important as $n$ is smaller, this being the case for $n$=20. It is thus understood that during the busiest hours, known as "peak hours," certain terminal sections could be blocked, whereas others have a low traffic. In order to avoid the blocking of certain terminal sections, it has been thought to balance the traffic of the different sections by using the lines of the subscribers having grouped lines. In effect, among the subscribers of a telephone exchange, some have a high calling rate and several lines have been assigned to them, these lines being known as grouped lines, which corresponds to a same call number. In spite of this assignment, each one of these grouped lines ensures an important traffic and it is necessary to distribute the lines of one same group into different terminal sections, for instance to make provision of one line of this type per terminal section. If the total number of grouped lines is higher than $g$, this appearing as unlikely, certain terminal sections will comprise more than one grouped line.

This equilibrium known as statistical equilibrium, is not sufficient however, because, when a grouped lines subscriber is called, the control circuit connects it to an idle and accessible line of a terminal section, without taking into account the business rate of the section, with the result that certain sections with a high business rate will be blocked more easily. In the continuation of the description, the expression business rate of a terminal section will designate the ratio of the number of busy lines of the section over the total number no of outputs of the said section.

The circuit 3 is designed for supplying to the control circuit 2 the code of the equipment number of the line connected to the terminal section having the lowest business rate among the terminal sections to which are connected the idle lines of the called subscriber. This circuit 3 comprises a scanning circuit 4 which enables to reach each one of the measurements circuits 9 associated to the terminal sections of the exchange, and to know the business rate of each section; in each measurement circuit 9 each one of the no outputs of the section is connected to a resistance referenced 10 for an output of the section T*g*, through a switch 13, the said switch being closed only when the corresponding output is busy; the other ends of the no equal resistances are connected to a summating resistance 12. Since the resistances such as those referenced 10 are equal, the current which flows through the summating resistance 12, and therefore the voltage which appears at its terminals, is proportional to the number of busy outputs, i.e. to the business rate of the section T*g*. The summating resistances of the different measurement circuits 9 are obviously equal. The voltage at the terminals of the summating resistances of a certain measurement circuit to which the scanner is connected, is coded in a coding circuit 5, then its code is compared in a circuit 6 to the code characterizing the business rate of the section having the lowest business rate among those which have been explorated since the beginning of the research cycle, the said cycle being started by the control circuit 2 when a grouped lines subscriber is called.

The circuit 7 is the code storage circuit. If the business rate of the terminal section just examined is the lowest of those examined since the beginning of the cycle, the code of the equipment number of the line connected to this terminal section is stored, along with the said business rate, through circuit 7, in order to compare it to the business rate of the next section to be examined. This circuit 7 controls also the positioning of the scanning circuit over the number of the terminal section to be examined. Thus, when all the terminal sections to which are connected the grouped lines of the called subscriber will have been examined, the circuit 7 will give the code of the equipment number of the line connected to the terminal section having the lowest business rate, the said code being available in order to be transferred in the control circuit 2.

Figure 2:
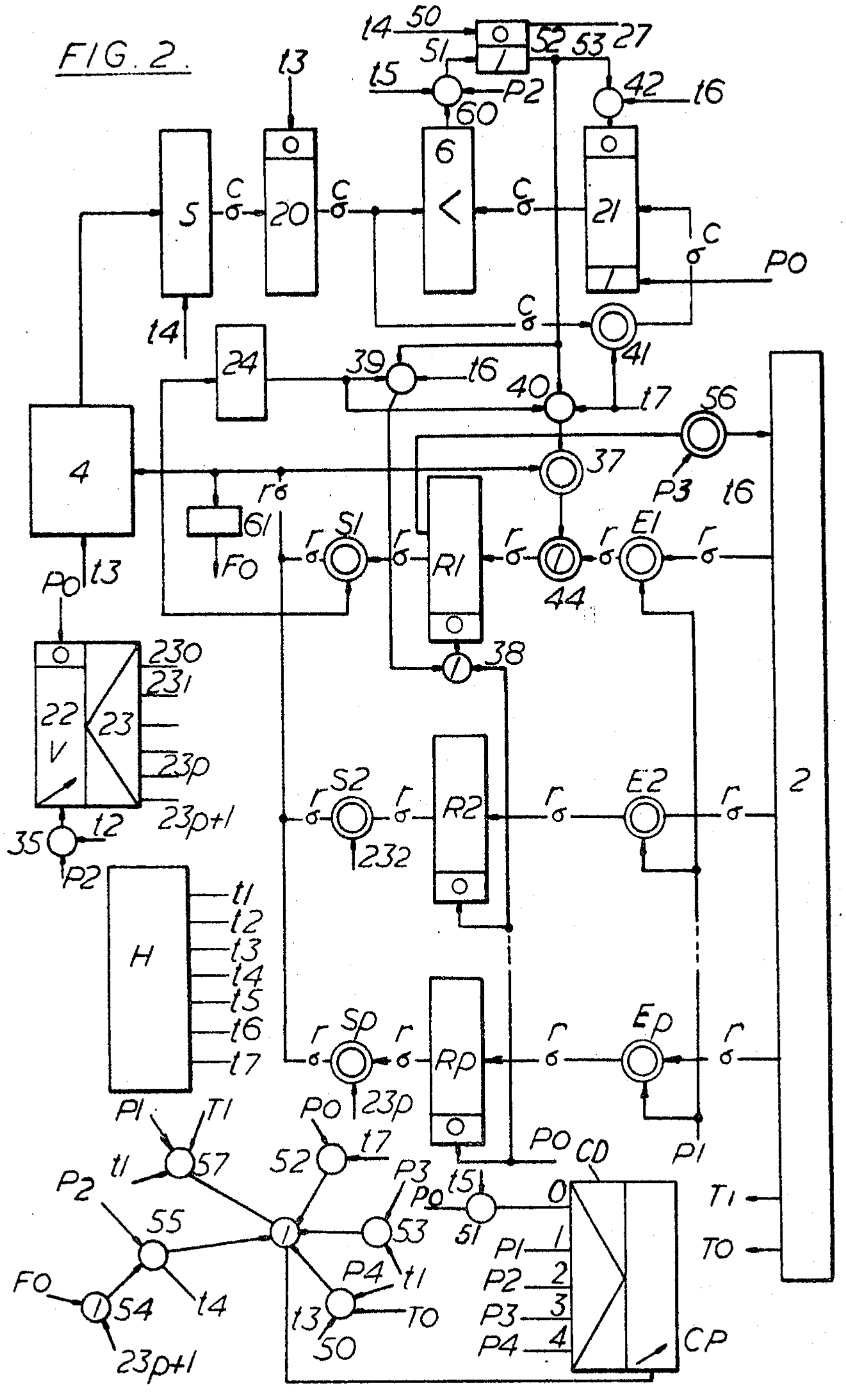
FIGURE 2 represents a particular example of achievement of the circuit according to the present invention.

The different signals which are necessary for the operation of the circuit 3, are assumed to be supplied by the control circuit 2; they will be defined in relation with FIGURE 2.

This circuit 3 will be better understood with the assistance of FIGURE 2 which gives an example of achievement thereof. On this figure, it has been assumed that the control circuit 2 supplies all the necessary signals for the operation of circuit 3, these different signals will be defined in a further paragraph.

On this FIGURE 2, a symbol such as the one bearing the reference 54, comprising a digit 1 surrounded by a circle, designates a mixing electronic gate called OR circuit, which supplies a positive signal on its output when a positive signal is applied on at least one of its inputs represented by arrows ending on the circle. If C and D designate the signals which are present on each one of the two inputs, this circuit achieves the logical condition noted by $C+D$.

A symbol such as the one bearing the reference 35 represents a coincidence electronic gate called AND circuit which supplies a positive signal on its output when its inputs represented by arrows ending on the circle, receive simultaneously a positive signal. If A and B designate the signals which are present on each one of the two inputs, this circuit achieves the logical condition noted by AB.

A rectangle, such as the one bearing the reference 24, designates a circuit known as inverter which, for a signal having the ground zero volt potential applied to its input, supplies on its output a positive signal, and supplies a zero volt signal when the input is at a positive potential. If E is the input signal, $\overline{E}$ will designate the output signal and it will be called the complement of E.

A symbol such as the one bearing the reference E1 which comprises two concentric circles represents *r* AND circuits in parallel controlled by a same signal, P1 in this particular case. This circuit will be called further on multiple AND circuits. The letter *r* placed near a conductor indicates a grouping of *r* conductors.

A symbol such as the one bearing the reference 6 represents a code comparator circuit which delivers a positive signal on its output, represented by an arrow extending out of a small side of the rectangle, when the *c* digit code supplied by the circuit 20 is lower than the code, having also *c* digits, supplied by the circuit 21. Such a circuit is described in the Review "Bell System Technical Journal" of September 1958, on page 11.84.

A symbol such as the one bearing the reference 27, represents a flip-flop circuit to which is applied a control signal on one of its inputs 50 or 51 in order to set it respectively to the 0 state or to the 1 state. A voltage of same polarity as the control signals is present either on the output 52, when the flip-flop circuit is in the 0 state, or on the output 53 when it is in the 1 state.

A symbol such as the one bearing the reference 20 represents a flip-flop register which comprises *c* flip-flops the 1 inputs of which are connected to the output conductors of circuit 5 and the 1 outputs of which are connected to the inputs of the comparator circuit 6. The digit 0 placed at one end of the register means that this latter is reset to zero when the signal *t*3 is applied.

The symbol referenced 22 represents a counter circuit with *v* flip-flops which counts the pulses supplied by the AND circuit 35 and which is reset to zero by the application of a signal P*o*. The 1 outputs of the flip-flops are connected to the *v* inputs of the decoder circuit 23 which transforms a binary code with *v* digits supplied by the counter 22 into a one out of $2^v$ code, i.e. a signal appears only on one among the $2^v$ output conductors. In fact, on FIGURE 2, only $p+2$ output conductors have been shown, referenced 23–0 to 23 $p+1$, $p+2$ being lower or equal to $2^v$ and the wire 23–0, for instance, will present a positive signal only when the counter 22 will be in the 0 position.

When a subscriber of a telephone exchange is called, the call number of the called subscriber, dialed by the calling subscriber, is recorded and transmitted to the control circuit 2. The control circuit 2 reads then a memory designated often as translator, by using as an address the call number and this memory gives the equipment number of the called subscriber, the said number comprising, in particular, the code number of the terminal section to which the called subscriber line is connected. When the called subscriber is a subscriber having grouped lines, the translator gives, in addition to the equipment numbers of the group lines, the number of the grouped lines.

It has been proposed to make provision for two translators, a first translator is constituted by a memory which comprises one address per call number to which is recorded either the equipment number of the line, or the number of grouped lines and an address, in the case of grouped lines. The second translator is assigned to the groups of lines and to the address supplied by the first translator where the equipment numbers of the lines of the group are recorded. It may be assumed for instance, that the equipment numbers of the *n* lines of a group are recorded at the address obtained from the first translator and to the $n-1$ successive addresses. Such a procedure which makes use of two translators enables a quick access in the case of an ordinary line, and allows to decrease the total capacity of the memory required.

The circuit 2, after it has received the number of the called subscriber, interrogates the first translator and if this number characterizes a group, interrogates the second translator from which it extracts successively the equipment numbers of the lines of the group. It will be assumed that the system according to the invention applies to a telephone system comprising a business memory of the subscribers, which is put up to date either along with the setting up and cutting out of the communications, or by a cyclic exploration of the lines the state of which is re-written in a quick access memory.

A telephone system of this type has been described in the Bell System Technical Journal, volume XLIII, September 1964. After it has extracted an equipment number of one line of the group, the circuit 2 interrogates the business memory of the lines in order to know the state of this line. If the line is busy, the circuit 2 gives up the equipment number, if the line is idle, the equipment number is recorded in a register. The circuit 2 interrogates then the second translator in order to know the equipment number of the following line of the group. The operations go on up to the time where all the idle lines of the group have been treated. However, in the case of important groups (twenty lines and even more, for instance), it is possible to apply the method according to the invention to only *p* idle lines of the group, *p* being the capacity of the circuit of FIGURE 2, i.e. the number of registers R1, R2 . . . R*p*, the circuit 2 stopping the reading of the second translator as soon as *p* idle lines of the group have been detected. As soon as the circuit 2 has received from the first translator the information that the called line belongs to a group, it provides a first signal T*o* to the phase counter CP, FIGURE 2, which is a five-position counter, which sets from the 4 position to the zero position for the condition: T*o* x P4 x *t*3 (AND circuit 50). The decoder CD associated to the counter CP supplies then a signal on its 0 output, this signal causing, by the intermediary of the electronic gate 51, the appearing, at the time *t*5, of a signal P*o* of reset to zero of the counter 22, of the registers R1 to R*p*, and the setting to the "1 position" of the register 21. In this position, the register 21 shows digits 1 at all its positions, i.e. it shows the maximum number it may display. In P*o* x *t*7 (electronic gate 52), the counter CP sets to the 1 position and the decoder CD supplies on its 1 output, a signal P1 which characterizes the phase during which the equipment numbers of idle lines of the group are transferred from the circuit 2 to the registers R1 to R*p*. This signal P1 is also transmitted to the circuit 2 in order to indicate to it that it may start the transfer outwards the registers R1 to R*p*. The detail of the transfer circuit included in the circuit 2, has not been described and is not part of the invention. For sake of clarity, it may be assumed however that this signal P1 starts, in the circuit 2, the reading of the second translator and that as soon as a line of the group is found idle, its equipment number is transferred to the register R1, the following one to the register R2, and so on. When the circuit 2 has checked the state of the *n* lines of the group, or when *p* idle lines have been detected and their equipment numbers transferred in the registers R1 to R*p*, the circuit 2 provides a signal T1 which causes, at *t*1, by the intermediary of the electronic gate 57, the passing of the counter CP to the 2 position. The signals *t*1 to *t*7 are successive signals of same duration supplied by a "clock" circuit referenced H on FIGURE 2. In this position, the circuit of FIGURE 2 has available all the information required and the circuit 2 is cleared and may carry out other operations, for instance, the setting up of another call. In P2 x *t*2, the electronic gate 35 causes the passing of the counter 22 to the 1 position and the decoder 23 supplies a signal 23–1 which opens the multiple gate S1 and closes, through the operation of the inverter 24, the electronic gates 39 and 40. As it has been explained hereabove, the register R1 contains an equipment number, i.e. the information related to the physical position of the line in the exchange. This information contains especially the number of the terminal section to which the line is connected. As it will appear further on, the electronic gates such as S*p* are used for transferring, towards the circuit 4, the contents of the register R*p*. It is assumed that the information related to the terminal section to which the line is connected is alone transferred towards the circuit 4. However, the transfers from a register R2 to R*p* towards the register R1 are carried out on the whole of the equipment number.

Since the AND circuit S1 is open, the code of the terminal section, recorded in the register R1, is transmitted to the scanning circuit 4; this circuit 4 enables to connect to the terminals of the summating resistances 12 (FIGURE 1) of the measurement circuit of the terminal section, the code of which is written in the register R1, the coding circuit 5 which supplies a code corresponding to the voltage which appears at the terminals of the said resistances, this voltage being proportional to the business rate of the group. The transfer of the information towards the encoder 5 takes place at the time *t*3 and the coding takes place at the following time *t*4, the code of the voltage being written in the register 20 reset to zero at the preceding time *t*3. At the time *t*4, the flip-flop 27 is reset to zero. The number *c* of binary positions of the registers 20 and 21 is determined by the number no of outputs included in a terminal section; it is assumed that the *g* terminal sections comprise the same number no of outputs; however, the operation may be limited to a smaller number of positions if a less accurate coding is accepted.

As it has been seen previously, owing to the signal P*o*, all the positions of the register 21 show the digit 1, this binary number *ao* with *c*1 digits corresponds to the maximum value which may be taken by the voltage to be coded. The code *a*1 which appears in the register 20 at the time *t*4, is certainly lower than the code *a*0 with *c*1 digits which is present in the register 21, so that the comparator circuit 6 supplies a signal which opens the AND circuit 60 at the time *t*5 x P2; the flip-flop circuit 27, which is set to the 0 state at the preceding time *t*4, sets to the 1 state, this enabling the resetting to zero of the register 21, at the time *t*6, by the AND circuit 42. This resetting to zero is followed at the time *t*7 by a transfer of the code *a*1 from the register 20 to the register 21 through the multiple AND circuit 41 controlled by the 1 output of the flip-flop circuit 27 and the clock signal *t*7. The two registers 20 and 21 show thus the same code *a*1. Thus, in the course of the following clock sequence, the code *a*2 which measures the business rate of the terminal section the address of which is displayed in the register R2, will be compared to the code *a*1 which measures the business rate of the terminal section just examined.

Since the aim of the circuit object of the present invention is to show, in the register R1, the code of the equipment number of the line connected to the terminal section having the lowest business rate it is clear that during the first clock sequence of the research cycle, the contents of the register R1 must not change, and an arrangement of the circuits must be provided for in order to avoid the transfer of the contents of the register R1 to itself. This circuit arrangement comprises an inverter circuit 24 which receives the signal of the 1 position of the counter 22 transmitted by the output, wire 23–1 of the decoding circuit 23. The inverter circuit 24 thus closes the AND circuits 39 and 40 when the counter 22 is in the 1 position, the said 1 position corresponding to the first section examined during the research cycle. Since the AND circuits 39 and 40 are closed, no transfer can be carried out because the multiple AND circuit is closed; furthermore, the register R1 has not been reset to zero at the time *t*6 because the AND circuit 39 supplies no signal at all. The following time *t*2 x P2 sets the counter 22 to the 2 position, the result of which is to activate the output conductor 23–2 of the decoder circuit 23, the said conductor 23–2 constituting one of the inputs of the multiple AND circuit S2. The code of the terminal section written in the register R2 is thus applied to the scanning circuit 4, the said circuit 4 connecting, at the time *t*3, the encoder 5 to the terminals of the summating resistance of the section the code of which is written in the register R2. The code $a2$ of the voltage at the terminals of the summating resistance is written in the register 20 and it is compared to the code $a1$; if $a2$ is lower than $a1$, there is, as it has been seen in the course of the first sequence, transfer at the time $t7$ of the code $a2$ from the register 20 to the register 21, this last register having been reset to zero at the time $t6$, since the output conductor 23–1 of the decoder circuit 23 is no more activated, the AND circuit 39 is open and its output signal, through the OR circuit 38, sets the register R1 to the 0 position. This register R1 is thus ready for recording the equipment number written in the register R2. This recording is carried out at the time $t7$, through the multiple AND circuit S2, opened by the signal which is present on the conductor 23–2 of the multiple AND circuit 37, opened at the time $t7$ by the output signal of the AND circuit 40 and of the OR circuit 44.

If $a2$ is higher or equal than $a1$, none of the two transfers described hereabove takes place, since the flip-flop circuit 27 remains at the 0 state, this closing the AND circuits 37 and 41. At the end of this second sequence, the code written in the register R1 will be that of the equipment number of the line connected to the terminal section having the lowest business rate among the two sections examined. If the number of sections to be examined is higher than 2, the counter CP remains in the 2 position and a third sequence begins.

It is understood that after several sequences processing in the way described hereabove, the code which will be written in the register R1 will be the code of the equipment number of the line connected to the terminal section having the lowest business rate. Two cases must be considered for explaining the end of the operation of the circuit. If the number of the equipment numbers corresponding to idle lines of the group is equal to the maximum number which can be treated by the circuit, viz. $p$, a the beginning of the $(p+1)$th sequence, the counter 22 sets to the $p+1$ position and the decoder 23 supplies a signal $23p+1$ which, through the operation of the electronic gates 54 and 55, causes in $23p+1$ x P2 x $t4$ the passing of the counter CP to the 3 position. The signal P3 supplied by the decoder CD is used for controlling in P3 x $t6$ the opening of the electronic gate 56 which causes the transfer, in a register not shown of the control circuit 2, the contents of the register R1, i.e. of the equipment number of the line of the group connected to the terminal section having the lowest business rate among the $p$ explorated sections. The circuit 2, as soon as it is available, uses this information for streamlining the call towards the line the equipment number of which has thus been determined.

If the number of the equipment numbers corresponding to idle lines of the group is lower than $p$, viz. for instance $s<p$, at the beginning of the $(s+1)$th sequence, the contents of the register $Rs+1$, viz. a code which comprises only 0 and which must not be assigned to any terminal section, is transferred to the circuit 4. The codes of terminal sections transferred to the circuit are also applied to the decoder circuit 61 which is designed in such a way as to supply a signal F$o$ when the code applied to it comprises only 0. This signal F$o$ causes, in F$o$ x P2 x $t4$, through the electronic gates 54 and 55, the passing to the 3 position of the counter and the generation of the signal P3 which acts in the way described hereabove.

At the time P3 x $t1$ (electronic gate 53) the counter CP sets to the 4 position, the circuit CD supplies then a signal P4 which indicates that the circuit is ready to carry out a new research.

The case has been considered in which the business rate of the terminal sections is measured by addition of currents, by means of resistances. It is understood that the contacts such as 13, FIGURE 1, may be either electro-mechanical contacts or electronic gates according to the type of switches used in the terminal sections.

On the other hand, in telephone exchange switching systems which make use of a business memory of subscribers, provision may be made for a circuit which, when interrogated by the circuit 4 (FIGURE 1) explorates the memory points associated to the lines of the terminal section, and makes the sum of the busy lines, this being a measurement of the business rate of the said section, when all the terminal sections serve the same number of lines. In this case, this information may be transmitted directly to the register 20, the encoder 5 being no more necessary. If the setting up to date of the business memory of the lines is carried out in a cyclic way, all the lines of the same section being explorated successively, it is possible to make provision for one register per terminal section. The information concerning the state of the lines may then be used on the one hand for the reset up to date of the business memory, and may be applied on the other hand to a counter which counts the number of busy lines in a terminal section. When all the lines of one section have been explored, the contents of the counter is transferred in the register associated to this section, and the counter is reset to zero afterwards in order to be ready for recording the information related to the following terminal section. In this case, the scanning circuit 4, FIGURE 2 causes in response to the reception of the code of a terminal section, the transfer of the contents of the business register assigned to this section directly in the register 20, FIGURE 2.

When the circuit 2 has available the equipment number which has been supplied to it by the circuit of FIGURE 2, it must carry out a new test for checking that the line which has been found idle previously is not inaccessible, owing to the internal blocking in the switching network. Since the blocking probability is low, the line is generally accessible. However, in the case where, owing to the internal blocking, the connection cannot be set up, the circuit 2 may cause a new research by the circuit of FIGURE 2, in which case the probability for this new research ending at the same line is extremely small.

While the principles of the above invention have been described in connection with specific embodiments and particular modifications thereof it is to be clearly understood that this description is made by way of example and not as a limitation of the scope of the invention.

What we claim is:

1. A circuit, associated with an electronic or semi-electronic switching system comprising an output group test circuit, this test circuit giving information proportional to the number of busy lines in the output group; connecting means for selectively connecting a coding circuit, associated with a register, to any test circuit; a memory where the equipment numbers of the subscribers lines are stored, said memory being organized in such a way that when interrogated at the address corresponding to a subscriber, the equipment number of the line or lines of a group associated with this subscriber are read in said memory, a part of this equipment number identifying the output group to which the line is connected, means for interrogating said memory at the beginning of the search for a connection with a called subscriber connected to the exchange through a group of lines; a plurality of registers for storing the equipment numbers of the lines of the group associated with said subscriber; means for reading successively the codes of the output groups in the said registers and for connecting an explorer circuit to the test circuit, the code of which is read in one register; a comparator circuit for comparing the number of busy lines of the investigated output group to the smallest number of busy lines measured in an output group since the beginning of the search, the said smallest number being stored in a register associated with the comparator circuit; means for transferring into the register of the comparator the number of busy lines measured in the investigated output group if it is smaller than the number previously stored, and, in this case, means to store the code of the line appertaining to the investigated output group in the register receiving the code of the line of the first output group to be investigated at the beginning of the search; means for detecting the end of the search when all the output groups are investigated, and transferring the code of the line appertaining to the least busy output group to the control circuit of the switching system.

UNITED STATES PATENTS

References Cited

3,221,107 11/1965 Seemann et al. -------- 179—18

KATHLEEN H. CLAFFY, Primary Examiner

W. A. HELVESTINE, Assistant Examiner